United States Patent Office 3,769,198
Patented Oct. 30, 1973

3,769,198
HYDROGENATION OF COAL USING
UNREDUCED CATALYST
Edwin S. Johanson, Princeton, Michael C. Chervenak, Pennington, and Roland H. Wolk, Lawrence Township, N.J., assignors to Hydrocarbon Research, Inc., New York, N.Y.
Filed May 24, 1972, Ser. No. 256,563
Int. Cl. C10g 1/06
U.S. Cl. 208—10                                    10 Claims

ABSTRACT OF THE DISCLOSURE

The liquid phase catalytic hydrogenation of coal to liquid and gas products is improved by the pretreatment of the catalyst with hydrogen, wherein the pretreatment temperatures are limited to about 200–400° F. and the catalyst is substantially unreduced before start-up oil is introduced into the reactor.

BACKGROUND OF THE INVENTION

U.S. Pat. 3,519,555 discloses a process for the liquid phase hydrogenation of coal to liquids and gases by passing hydrogen and a coal-liquid slurry upwardly through a reaction zone containing particulate catalyst under such conditions that the catalyst is maintained in random motion in the liquid without being carried out of the reaction zone to any undesired extent. This improved process is known as the "ebullated" bed process and with limited pressure drop and nearly isothermal conditions in the reactor, the hydrogenation can be carried out under nearly optimum conditions, resulting in yields in the order of four barrels of liquid per ton of coal feed.

In the start-up of an ebullated bed reaction process, either in the initial period or after an extended shut-down, it is customary to accomplish a preheating of the reactor as well as the catalyst. It has also been established (based on prior experiments on residuums) that if the catalyst was heated to about 700 to 800° F. while circulating warm hydrogen enriched gas through the reactor for a period of several hours, prereduction of metal oxides in the catalyst, usually nickel, tungsten, or cobalt-molybdenum oxides, would result. It was deemed advantageous to obtain this reduced state to facilitate the formation of the sulfide state of the metals upon the subsequent introduction of sulfur bearing streams, the sulfide state being considered the most active condition for use as hydrogenation-desulfurization catalyst.

Following the preheating of the reactor and prereduction of the catalyst with hydrogen, the catalyst was then put into random motion or ebullation by introducing a heated sulfur bearing liquid characteristic of the process liquids such as No. 4 fuel oil into the lower end of the reactor. As this oil was circulated, temperatures of the bed of catalyst and the reactor were slowly raised to the ultimate operating temperature, 800° F. or higher as desired. Straightforward application of this procedure to hydroconversion of coal would lead to the introduction of the coal in liquid slurry form at this point when the temperature is approaching the ultimate operating temperature when sufficient conversion of the coal would be attained to prevent difficulties that would occur with a high solids content mass passing through the expanded bed. However, experience has indicated that the circulating fluid in the reactor, and the slurry medium for the coal must be compatible with the liquid products that result from the conversion of coal, that is, the slurry medium does not reject or fail to form a single phase with those products, lest the rejected phase form quiescent zones within the reactor thereby failing to maintain the random motion of the catalyst necessary to prevent local catalyst overheating from the exothermic coal hydroconversion reactions, and consequent coke formation within the catalyst and loss of catalytic surface area. This criterion for a suitable fluid is, of course satisfied perfectly by liquids of the type produced in the process, and liquids produced in companion coal conversion processes, such as distillate fractions of the tars produced in coking of coal. Such liquids have a high proportion of aromatic, cyclic, and polycyclic hydrocarbons, in most cases wiht low hydrogen saturation of the aromatic rings.

As a consequence, the desirability of attaining the most effective rduction- sulfiding procedure must be reconsidered in view of the increasing amounts of cyclic oils required for the hydroconversion of coal. When such oils are introduced to the catalyst of maximum activity, the high rates of hydrogen takeup into the low saturation oils combined with cyclic nature of the fluids results in high internal temperatures in the catalyst particles, and an increased formation of coke within the catalyst particles. This consideration suggests that the initial use of a low activity catalyst, existing as nearly as possible in the metal oxide state and which catalyst in time will go over to the metal sulfide state as a result of exposure to the sulfur containing compounds in the coal, will result in a catalyst for the hydroconversion of coal with the highest level of sustained performance.

SUMMARY OF THE INVENTION

It has now been found that the economy of operation of the hydrogenation process for coal conversion is materially improved by a pretreatment procedure of the catalyst. In this pretreatment, the catalyst is heated to a temperature not in excess of 400° F., and preferably 200–300° F., with warm hydrogen enriched gas before the start-up oil is introduced into the reactor. The unreduced catalyst is then brought to a process temperature of approximately 850° F., while the start-up oil is circulated through the reactor so as to induce the random motion, ebullation of the catalyst particles, at which point coal is introduced to the reactor in slurry form within a fluid of similar character to that of the startup oil. The start-up oil and slurrying medium for the coal should approached the characteristics of the liquid produced from the coal hydroconversion, particularly with respect to the aromatic character and cyclic nature. This unreduced catalyst exhibits a sustained performance superior to that of prereduced catalyst and the time required for start-up of reactor operations is significantly shorter than when prereduction of the catalyst is required.

This superior performance of the unreduced catalyst is unexpected in view of previous experience with reduced catalyst. This previous experience did not indicate that the proportion of the initial catalyst potential capability, that was lost by not prereducing the catalyst so as to slowly form the sulfide state, could be recovered on the unreduced catalyst through the course of normal coal hydroconversion operations over a practical amount of time. The end result thereof is the fact that the unreduced catalyst does, in a practical amount of time reach a metal sulfide state achieved more rapidly through prereduction of the catalyst, but has sustained fewer thermal and catalytic shocks in the process.

In coal hydroconversion operations using a typical bituminous coal wherein one system uses prereduced catalyst and the other system uses unreduced catalyst, a distinct difference in the overall results is noticed. In particular, the hydroconversion using unreduced catalyst results in about a 5 percent greater volumetric liquid recovery of coal fed to the operation. Alternatively, the use of the unreduced catalyst permits processing of about 30 percent more coal per unit of catalyst used while producing the same amount of liquid per unit of coal fed to the operation. Improvements over an operation using a prereduced catalyst through using the unreduced catalyst are also noticed in the proportion of distillable oils in the liquids produced by the hydroconversion operation and in the quality of the product fractions obtained such as the sulfur content thereof.

In accordance with this invention, two runs were made with both operations using a cobalt molybdate catalyst on an alumina support for the conversion of Illinois No. 6 Seam bituminous coal. Reactor performance using the unreduced catalyst procedure was studied until 1900 pounds of coal had been processed per pound of catalyst used. At all stages of the parallel operations, the performance was inferior with the prereduced catalyst (maximized presulfiding of the catalyst) such that the reactor could handle only 1400 pounds of coal per pound of catalyst in order to achieve results comparable to those using the unreduced catalyst after processing 1900 pounds of coal. It has also been found that it is possible to use a start-up oil having a low sulfur content when the coal hydroconversion operation uses the unreduced catalyst. The limited sulfur content of about 0.07 weight percent obtained from the coal derived oils used provides all of the presulfiding of the unreduced catalyst that is necessary for the initiation of coal operations.

In all aspects of the hydroconversion of coal operation, it is concluded that the modified start-up procedure using unreduced catalyst is superior to the operation wherein the catalyst has been prereduced to the metal sulfide state.

DESCRIPTION OF THE PREFERRED EMBODIMENT

Figure 1:
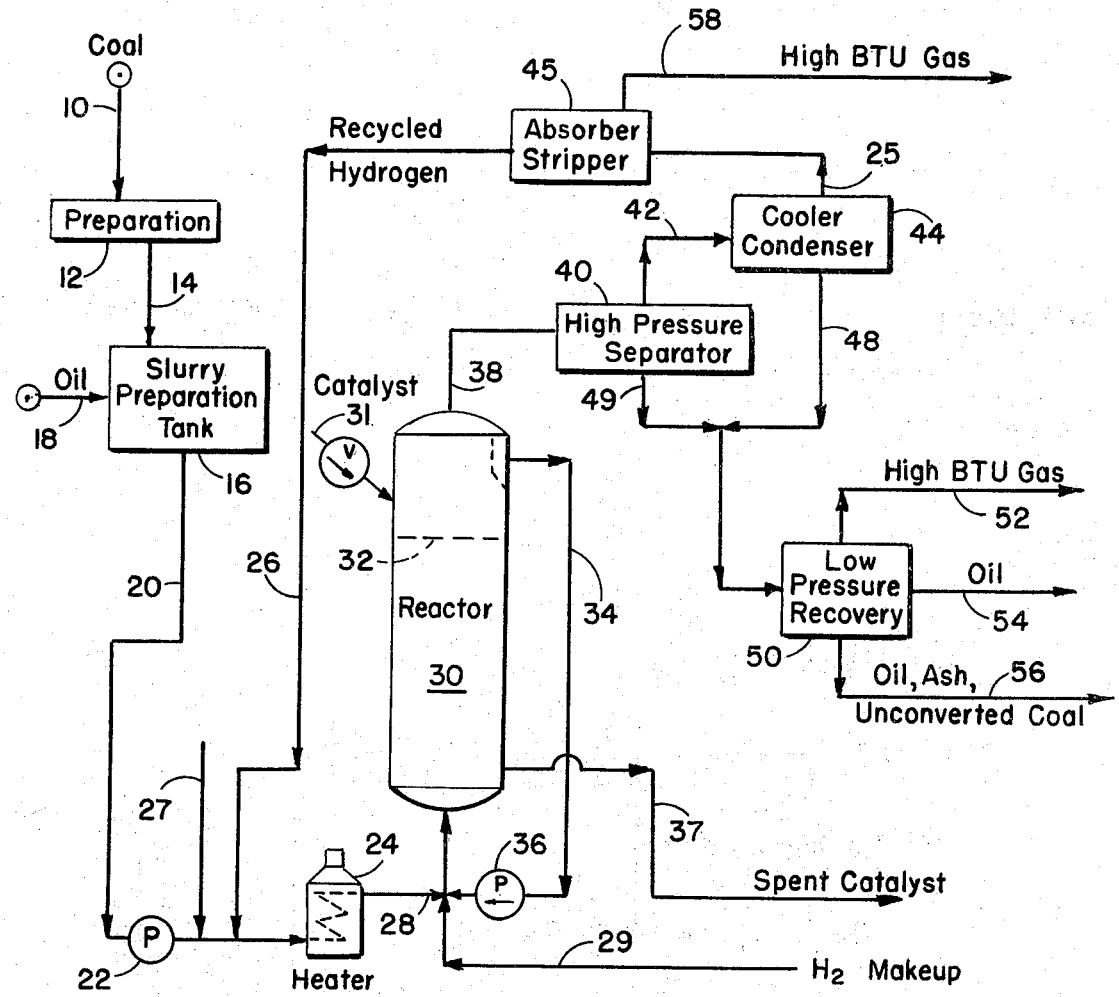
FIG. 1 is a schematic arrangement of the essential coal conversion equipment required to incorporate the invention.

As shown in FIG. 1, a coal such as bituminous, semi-bituminous, sub-bituminous or lignite entering the system at 10 is first passed through a preparation unit generally indicated at 12. In such a unit it is desirable to dry the coal of substantially all surface moisture and to grind the coal to a desired mesh, generally less than 20 mesh.

The coal fines discharge at 14 into the slurry preparation tank 16 where the coal is blended with a carrying oil indicated at 18 which, as hereinafter pointed out, is conveniently made in the system. To establish an effective transportable slurry, it is found that the ground coal should be mixed with at least about an equal weight of carrying oil and generally not more than ten parts of oil per part by weight of coal.

The coal-oil slurry 20 is pumped to reactor pressure by pump 22 and is then passed through heater 24 to bring the slurry up to a temperature in the order of 450° F. to 850° F., and preferably 600° F. to 750° F. Recycle hydrogen in line 26 is preferably also provided upstream of heater 24, as well as catalyst at 27. Such heated slurry mixture is then discharged into the feed line 28, wherein it may be supplied with make-up hydrogen from line 29 as required. The temperature of the mixed preheated streams is maintained at a level that will result in the desired reactor temperature after release of the exothermic heat of the coal hydroconversion reactions.

The entire mixture of coal-oil slurry and hydrogen then enters one or more reactors 30, passing upwardly from the bottom at a rate of form 30 to 150 pounds of coal per hour per cubic foot of reactor liquid phase volume and under hydrogen partial pressure in the range of 1000 to 3000 p.s.i.g. and at a temperature in the range of 750 to 950° F., to accomplish the desired hydrogenation.

By concurrently flowing streams of liquid and gasiform materials upwardly through a vessel containing a mass of solid particles of a contact material which may be a particulate hydrogenation catalyst entering at 31, and expanding the mass of solid particles at least 10 percent over the volume of the stationary mass, the solid particles are placed in random motion within the vessel by the upflowing streams.

The solid contact material (herein hydrogenation catalyst) may be added to the reactor in the ratio of about 0.01 to 2.0 pound of catalyst per ton of coal. Such a catalyst would be promoters such as cobalt, molybdenum, nickel, tin, iron, iron and combinations thereof deposited on a base such as alumina, magnesia, silica, and the like. The catalyst need not be added continuously nor is it required that it be in fine admixture with the coal. It is preferably in the form of beads, pellets, chips, extrudates or like particles, at least $\frac{1}{32}$ inch size and more frequently in the range of $\frac{3}{16}$ to $\frac{1}{4}$ inch (i.e., between about 3 and 14 mesh screens of the U.S. Std. scale). However, the catalyst may also be a finer material in the range of 60 to 325 mesh (U.S. Std.). The size and shape of the particles used in any specific process will depend on the particular conditions of that operation, e.g., the density, viscosity and velocity of the liquid involved in that process.

For an ebullated bed process, the throughput rate of upflowing liquid and gas causes the mass of solid particles to become expanded and at the same time placed in random motion. The gross volume of the mass of contact particles expands when ebullated without, however, any substantial quantity of the particles being carried out of the reactor by the upflowing liquid and, therefore, a fairly well-defined upper level of randomly moving particles establishes itself in the upflowing liquid. The upper level 32 of the catalyst above which few, if any, catalyst particles ascend will hereinafter be called the upper level of ebullation.

In general, the gross density of the stationary mass of contact material will be between about 25 and 200 pounds per cubic foot, the flow rate of the liquid through the reactor will be between about 5 and 120 gallons per minute per square foot of horizontal cross section of the ebullated mass, and the expanded volume of the ebullated mass will be at least 10 percent greater and usually not more than about double the volume of the settled mass. A recycle liquid stream 34 may be removed from above the upper level of ebullation 32 and recycled by pump 36 to the bottom of the reactor 30 to maintain the desired superficial upward liquid velocity in the reactor. Spent catalyst may be periodically removed from the reactor as desired by drawoff 37.

The reactor effluent stream 38 passing to high pressure separator 40 includes gaseous fractions and is virtually free of solid particles of contact material, although it may contain some ash and unconverted organic coal in the liquid. From the separator 40, a gas stream is removed at 42 and then passed to cooler-resistance 44. A hydrogen recycle in line 25 removed from the cooler-condenser 44 may be returned to the reactor 30 after passing through an absorption-stripping system 45 to supplement the hydrogen requirement. A liquid stream 48 from cooler-condenser 44 can be joined with liquid stream 49 from the separator 40 and passed to the low pressure recovery system 50.

The low pressure separator 50 permits removal of a high B.t.u. heating value gas product at 52, a solids-free liquid at 54, and an oil and char product at 56. A portion of the liquid from lines 54 and 56 may be used as the slurry oil 18. A high B.t.u. heating gas is also removed from the absorption-stripping system 45 through line 58.

EXAMPLE

The following Table I compares the results of two significant operations of coal hydroconversion, employing a cobalt molybdate on alumina catalyst. Column B is based on a run in which the catalyst in the reactor had been reduced with hydrogen gas in situ at 700° F. for six hours before start-up oil was introduced to the reactor. In column A, the results are for a run in which the catalyst was heated only to 300° F. before start-up oil was introduced. In both cases, a distillate fraction containing 0.07 weight percent sulfur and boiling between 500 and 800° F. derived from the coking of coal was used as start-up oil. The results are given for various stages of continuous runs and indicate the accumulated amount of coal that had been processed to that point of the run.

These data indicate, that liquid production following the column A technique, is initially of the order of 0.2 barrels per ton of coal higher, in about a 4.5 barrels per ton production. This difference narrows as increasing amounts of coal are processed, but is always of the magnitude of 0.1 barrels per ton or greater. The sulfur content of the non-distillate oil is about 0.1 weight percent lower throughout the entire range of coal processed, in the range of 0.3 to 0.7 weight percent sulfur. The proportion of the distillable oils in the liquids produced appears to be about the same for the two techniques A and B initially. With increased coal processing, a higher proportion of distillate oil is evident following the A technique, in the order of 3 percent of the liquids produced.

Figure 2:
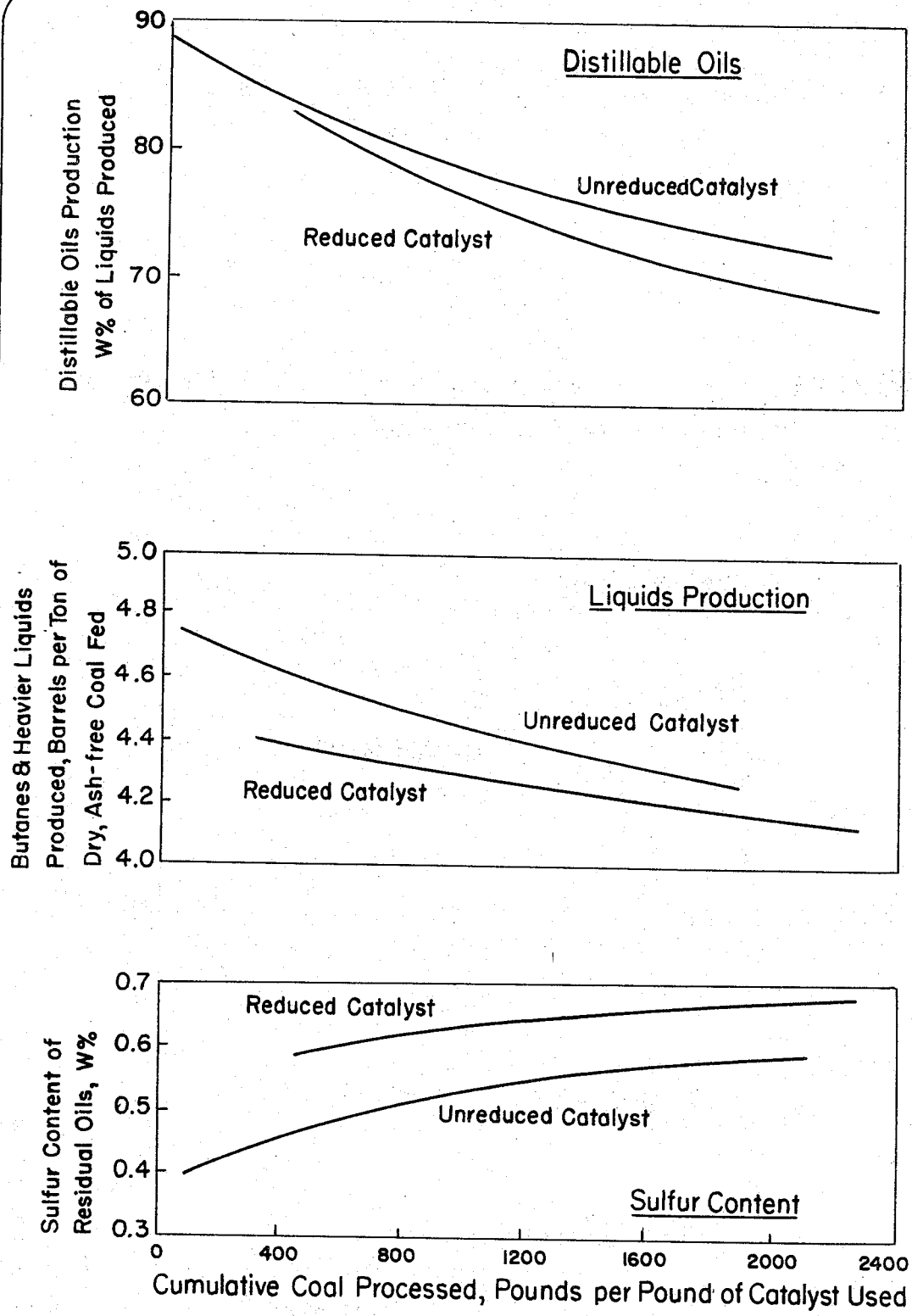
FIG. 2 is a plot showing the improved coal hydroconversion operation of the unreduced catalyst over the reduced catalyst in liquids production, distillable oils produced and sulfur content of the product.

The data are plotted in FIG. 2 for the two runs A (unreduced catalyst) and B (reduced catalyst) to better show the stability of performance with increasing amount of coal processed as to liquids produced, distillable oils produced and sulfur content of product. These plots support the observations made above. In addition, they indicate the amount of additional coal that can be processed using the improved catalyst handling technique, e.g., the performance of the two forms are essentially the same after processing 1,400 and 1,900 pounds of coal per pound of catalyst, so that for a given result the improved form will consume about 25 percent less catalyst per unit of coal fed or oils produced.

The catalysts from the two runs achieved virtually the same metal sulfide state as indicated by the sulfur content of the catalysts recovered after the operations, summarized, 4.4 weight percent for run A, and 4.1 weight percent for run B.

TABLE I

Comparison of Coal Hydroconversion Results vs. Catalyst Prereduction Temperatures

| Operating conditions: | | | | | | | |
|---|---|---|---|---|---|---|---|
| Coal feed, lbs./hr./ft.³ settled catalyst volume | 69 | | | | | | |
| Reactor temperature, °F | 850 | | | | | | |
| Hydrogen partial pressure, p.s.i. | 2,250 | | | | | | |
| Recycle slurry oil, lbs./lb. feed | 1.0 | | | | | | |
| Hydrogen feed, s.c.f./lb. coal feed | 25 | | | | | | |

| Operation | A | B |
|---|---|---|
| Reactor temperature at introduction of start-up oil, °F | 300 | 700 |
| Coal feed composition, wt. percent: | | |
| Carbon | 69.4 | 68.7 |
| Hydrogen | 5.2 | 5.3 |
| Nitrogen | 1.15 | 1.13 |
| Sulfur | 4.9 | 4.7 |
| Ash | 10.2 | 10.0 |
| Volatile matter | 41.1 | 42.6 |
| Fixed carbon | 48.7 | 47.4 |

| Operating results: | | | | | | | |
|---|---|---|---|---|---|---|---|
| Coal processed, cumulative lbs./lb. catalyst charged | 100 | 550 | 1,200 | 1,900 | 450 | 1,400 | 2,300 |
| Butanes and heavier liquids produced, barrels/ton of dry ash-free coal | 4.71 | 4.55 | 4.40 | 4.25 | 4.37 | 4.23 | 4.11 |
| Distillable oils, wt. percent of liquids produced | 87.7 | 82.5 | 77.9 | 72.3 | 83.5 | 70.8 | 69.3 |
| Sulfur in non-distillable oil, wt. percent | 0.37 | 0.50 | 0.56 | 0.52 | 0.59 | 0.65 | 0.68 |

While we have shown and described a preferred form of embodiment of our invention, we are aware that modifications may be made thereto and we, therefore, desire a broad interpretation thereof within the scope and spirit of the description herein and of the claims appended hereinafter.

We claim:

1. A start-up procedure for the catalytic hydrogenation of coal which comprises:
   (a) heating the catalyst filled reaction zone with pressurized hydrogen at a temperature in the range of 200° to 400° F.;
   (b) introducing a start-up oil compatible with oils derived from coal and resuming the heating of the catalyst filled reaction zone;
   (c) introducing a coal-oil slurry into the pressurized reaction zone when the zone has reached a temperature of at least 750° F.;
   (d) maintaining the temperature within the reaction zone in the range of 750 to 950° F.;
   (e) withdrawing gas and liquid hydrocarbon products from the reaction zone.

2. A start-up procedure as claimed in claim 1 in which the further heating medium for the reaction zone is low viscosity low sulfur oil of the types that are derived from the thermal and catalytic conversion of coal.

3. A start-up procedure as claimed in claim 1 in which the catalyst is a hydrogenation catalyst selected from the class consisting of cobalt, molybdenum, nickel and tungsten, deposited on a carrier selected from the class consisting of silica, alumina and combinations thereof.

4. A start-up procedure as claimed in claim 1 wherein the coal-oil slurry is introduced to the lower part of the reaction zone under conditions to place the catalyst in random motion in the liquid.

5. A start-up procedure as claimed in claim 4 wherein the coal-oil slurry feed utilizes bituminous coal.

6. A process for the catalytic hydrogenation of coal solids wherein the coal solids in a liquid slurry are passed upwardly through a pressurized reaction zone in the presence of hydrogen and a particulate catalyst, in which a start-up oil is first contacted with the catalyst at temperatures below about 400° F. and the liquid slurry containing the coal solids is first contacted with the catalyst at a temperature of at least 750° F.

7. A process as claimed in claim 6 in which the catalyst is selected from the class consisting of cobalt, molybdenum, nickel and tungsten and is not appreciably reduced before contacting the coal solids.

8. A process as claimed in claim 6 in which the principal reaction is carried out at a temperature between 750° and 950° F. and a pressure between 1000 and 3000 p.s.i.g., and conversion of at least 85 percent of the coal is achieved.

9. A process as claimed in claim 6 in which the catalyst utilization is such that more than 1000 pounds of coal are processed per pound of catalyst employed.

10. A process as claimed in claim 8 wherein the coal is bituminous type.

References Cited

UNITED STATES PATENTS

| 2,953,519 | 9/1960 | Bercik et al. | 208—143 |
| 3,291,722 | 12/1966 | Taylor et al. | 208—110 |
| 3,519,555 | 7/1970 | Keith et al. | 208—10 |

DELBERT E. GANTZ, Primary Examiner

S. L. BERGER, Assistant Examiner